United States Patent
Jadoul

(10) Patent No.: US 6,240,297 B1
(45) Date of Patent: May 29, 2001

(54) DOCKING STATION FOR MOBILE TELECOMMUNICATION HANDSET

(75) Inventor: Marc Jadoul, Beveren (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/203,355

(22) Filed: Dec. 2, 1998

(30) Foreign Application Priority Data

Dec. 4, 1997 (EP) .................................................. 97402938

(51) Int. Cl.$^7$ ...................................................... H04Q 7/20
(52) U.S. Cl. ...................... 455/466; 455/463; 455/573; 455/557; 455/566
(58) Field of Search .................... 455/466, 463, 455/462, 573, 557, 566

(56) References Cited

U.S. PATENT DOCUMENTS

| | | | |
|---|---|---|---|
| 4,905,272 | * | 2/1990 | Van de Mortel et al. ............ 455/410 |
| 5,450,471 | * | 9/1995 | Hanawa et al. ...................... 455/552 |
| 5,587,560 | * | 12/1996 | Crooks et al. ..................... 178/18.03 |
| 5,774,793 | * | 6/1998 | Cooper et al. ...................... 455/89 |
| 5,870,680 | * | 2/1999 | Guerlin et al. ..................... 455/557 |
| 5,940,767 | * | 8/1999 | Bourgeois et al. ................. 455/466 |
| 5,953,657 | * | 9/1999 | Ghisler ............................. 455/417 |

FOREIGN PATENT DOCUMENTS

| | | | |
|---|---|---|---|
| 0 304 998 A2 | | 3/1989 | (EP) . |
| EP-0123456-A2 | * | 1/2000 | (EP) ...................................... 100/100 |
| 2 264 613 | | 9/1993 | (GB) . |

OTHER PUBLICATIONS

Harry Newton, 1994, Newton's Telecom Dictionary, p. 254.*

* cited by examiner

*Primary Examiner*—Curtis Kuntz
*Assistant Examiner*—Barry W Taylor
(74) *Attorney, Agent, or Firm*—Sughrue, Mion, Zinn, Macpeak & Seas, PLLC

(57) ABSTRACT

Docking station for at least one mobile or cordless telecommunication handset (3), particularly a phone handset, said docking station comprising a base (1) able to receive the handset (3), characterised in that the base (1) is adapted to receive simultaneously a plurality of mobile telecommunication handsets (3) and comprises therefor a plurality of locations (2) for a handset (3), the docking station comprising a public display (4) and an interface processor (5) between each location (2) of the base (1) and the display (4), said interface processor (5) comprising means for detecting an incoming call for a handset (3) docked in the location (2) and for controlling the display (4) in order to notify this detection.

10 Claims, 4 Drawing Sheets

DOCKING STATION FOR MOBILE TELECOMMUNICATION HANDSET

BACKGROUND OF THE INVENTION

This invention relates to a docking station for at least one mobile or cordless telecommunication handset, particularly a phone handset, said docking station comprising a base able to receive the handset.

A known docking station of this kind is a single cordless phone handset loading station for loading the batteries of a single handset.

Now that mobile telephone, and more particularly GSM, has become popular and more and more people carry a mobile telephone handset, it sometimes occurs that the ringing of the mobile telephone handset can be disturbing, for example during a meeting or in a restaurant.

Some restaurants already collect GSM handsets on entry and notify their owner of an incoming call. This solution however requires a person watching continuously the collected handsets and the displacement of a person for notifying, for example by means of a board, a called handset owner.

SUMMARY OF THE INVENTION

The aim of the invention is to provide a docking station which not only permits docking but also avoids the disturbance created by ringing of a telecommunication handset without the above mentioned drawbacks, this without requiring the intervention of personnel.

This aim is obtained by the fact that the base of the docking station is adapted to receive simultaneously a plurality of mobile telecommunication handsets and comprises therefor a plurality of locations for a handset, the docking station comprising a public display and an interface processor between each location of the base and the display, said interface processor comprising means for detecting an incoming call for a handset docked in the location and for controlling the display in order to notify of this detection.

These means may be such that the display displays information about the detected incoming call in the form of a number allotted to the location of the called handset or/and custom information such as the handset identification number (that is the "called ID number") or/and the name of the handset owner, and/or even an identification of the caller, e.g. the "caller ID number".

The docking station can comprise a power supply for handset battery recharging.

In this case the batteries of the handsets can be loaded during docking.

BRIEF DESCRIPTION OF THE DRAWINGS

Other details and advantages of the invention will be made clear in the following description of a docking station according to the invention, given as an example only and with reference to the accompanying drawings, wherein.

DETAILED DESCRIPTION OF THE INVENTION

Figure 1:
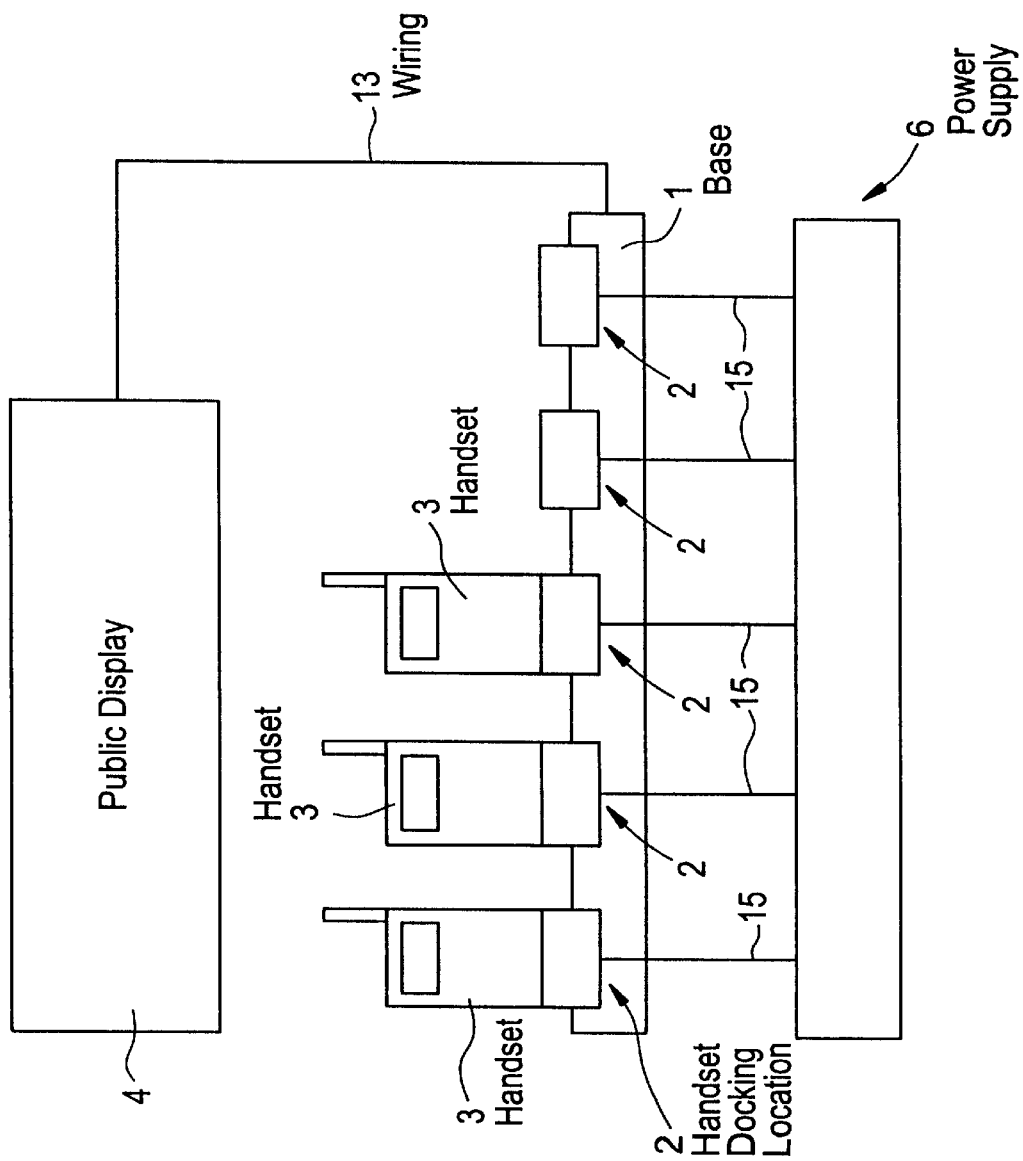
FIG. 1 is a schematic view of a docking station according to the invention.
Figure 2:
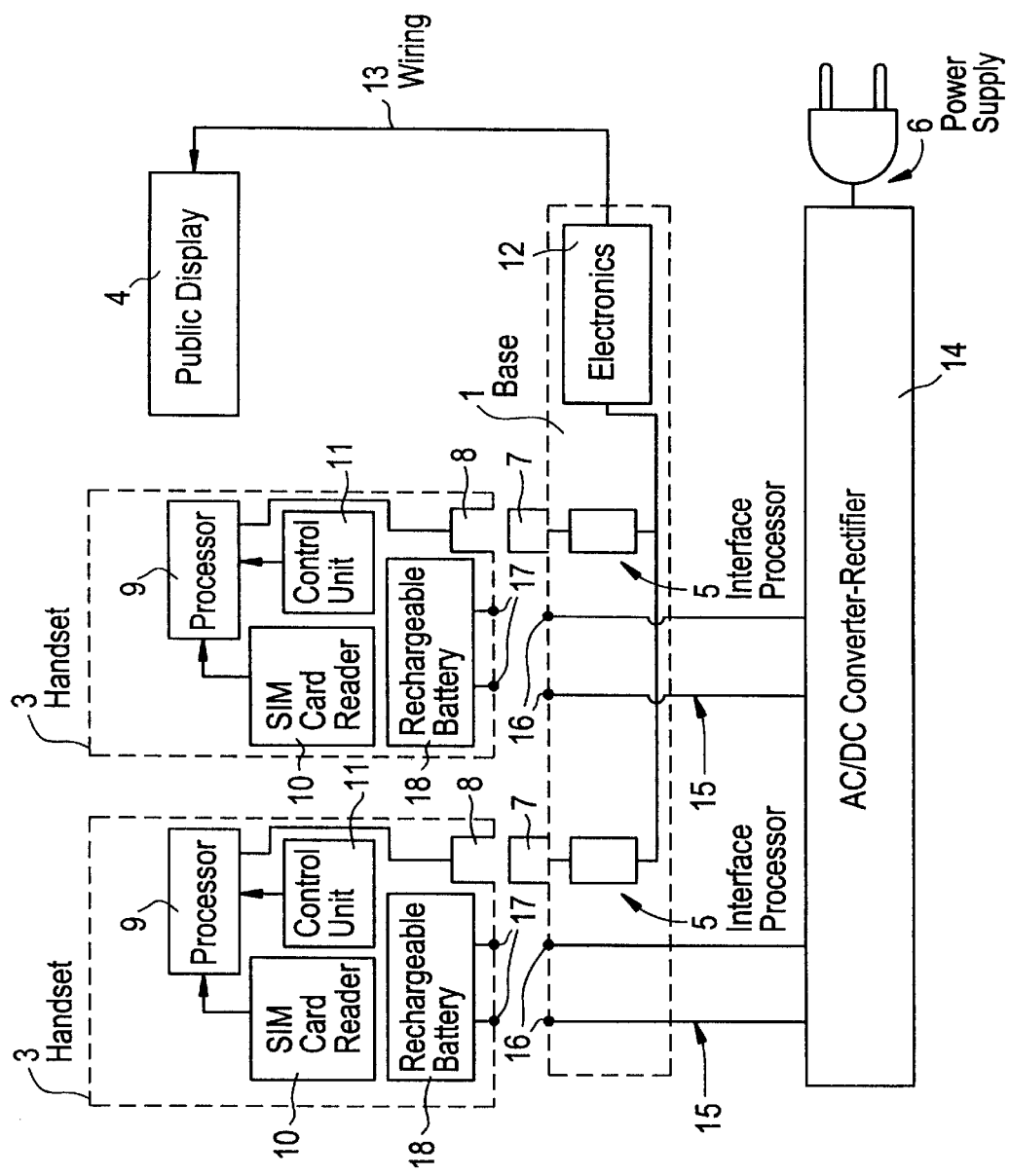
FIG. 2 is a block diagram of a part of the docking station in FIG. 1.

The docking station schematically represented in the figures comprises essentially a base 1 comprising a number of locations 2 able to receive a number of GSM handsets 3, a public display 4, an interface processor 5 between any of the possible handsets 3, this is between each of the locations 2 and the display 4, and a DC power supply 6 to any of said locations 2.

In the represented example, the number of locations 2 is five, while in three of them a GSM handset 3 has been placed, but it is obvious that the number of locations 2 and consequently possible handsets 3 is not limited to these numbers.

Figure 4:
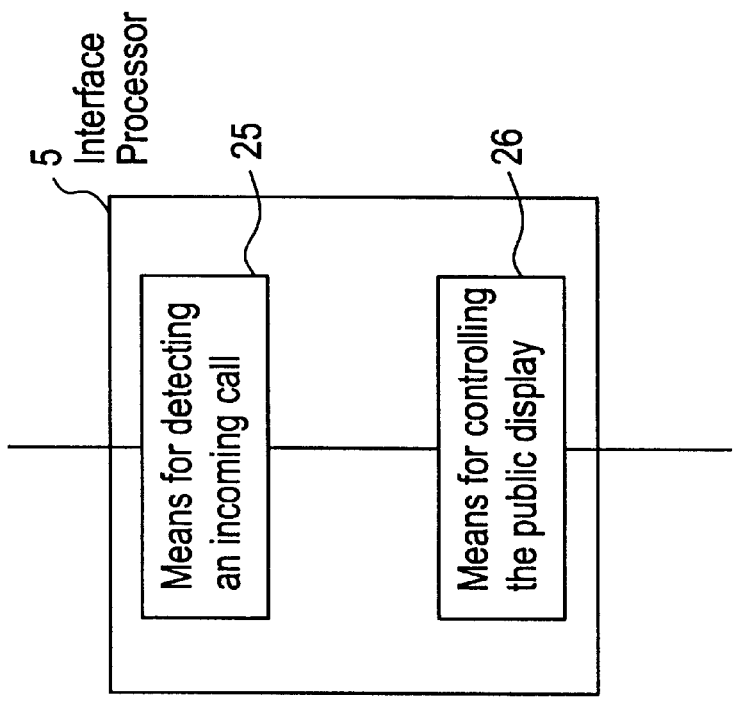
FIG. 4 is a block diagram view of an interface processor.

As illustrated in FIG. 4, each of the interface processors 5 comprise means 25 to detect an incoming call for a possible handset 3 docked in the location 2 to which the interface processor 5 belongs and means 26 for controlling the public display 4 in such a way that it displays information about this incoming call in the form of a number allotted to the location 2 of the called handset 3 and/or custom information such as the identification number of the handset 3 (i.e. the "called ID number"), or the name of the handset owner, and/or even an identification of the caller (e.g. the "caller ID number").

These means comprise, besides the required electronics, a connector 7 at the corresponding location 2 permitting a connection with an output port 8 of the handset 3 possibly docked in this location 2, either directly or by means of an adapter, for instance an interface card such as the ones used for connection to a computer or facsimile apparatus.

The output port 8 of a GSM handset 3 is connected to a handset interface processor 9 located inside the handset 3, which processor 9 is connected to the SIM card reader 10 and a control unit 11.

Figure 3:
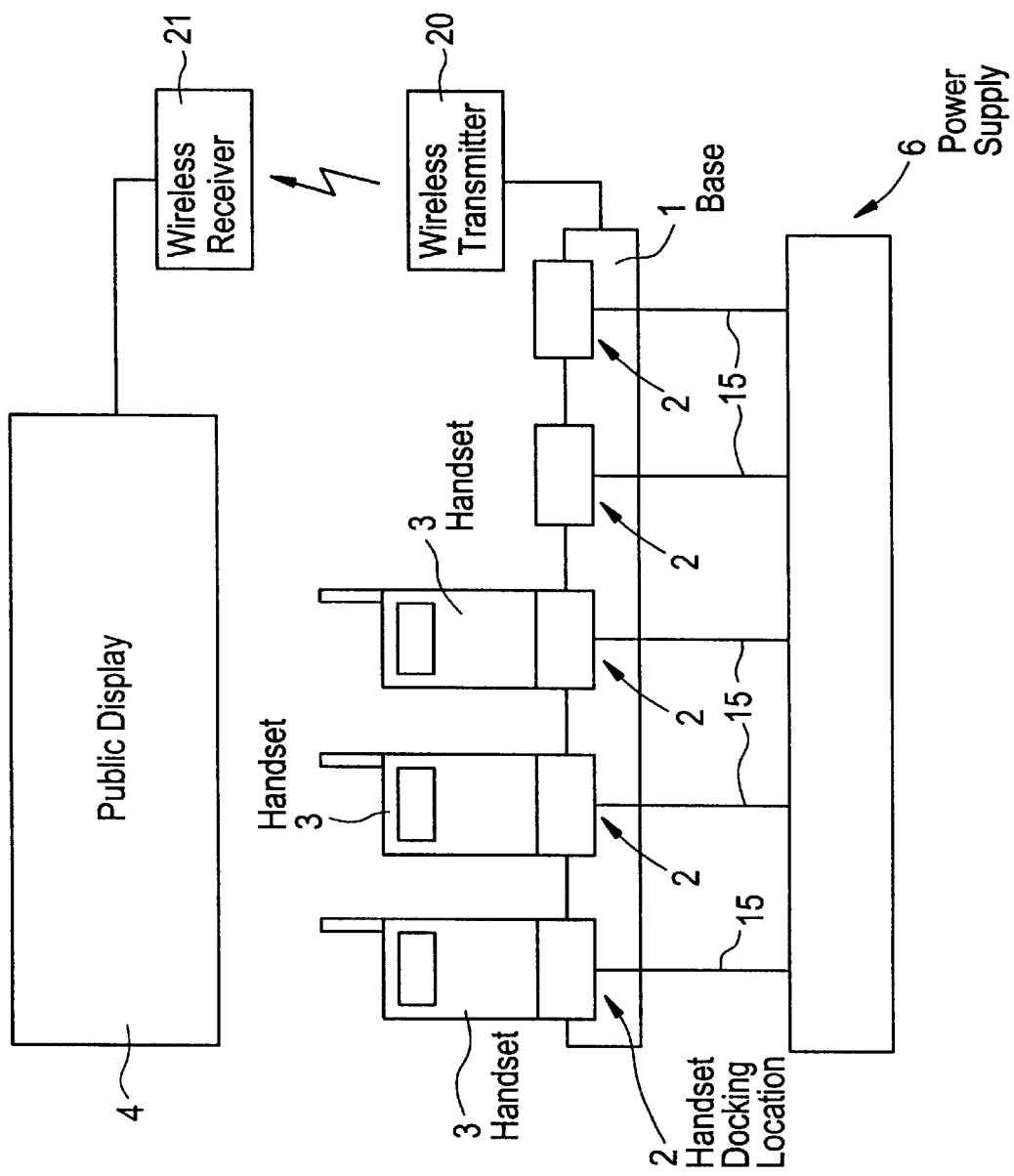
FIG. 3 is a schematic view of a docking station according to a further embodiment of the invention.

The interface processors 5 are connected to the display 4 by means of electronics 12 mounted in the base 1 and a wiring 13 (FIG. 1) or a transmitter-receiver 20,21 (FIG. 3) for wireless transmission.

The display 4 may be a classical display with LED's or a monitor.

The power supply 6 comprises an AC/DC converter-rectifier 14 mounted in the base 1 and a connection 15 to two terminals 16 on each location 2, said terminals 16 permitting contact directly, or by means of an adapter, to the terminals 17 of the rechargeable battery 18 of the handset 3 docked in said location 2.

In a space wherein the ringing of the handset 3 could be disturbing, for instance a meeting room or a restaurant, a docking station as described herebefore is placed, with the base 1 preferably at the entrance and the display 4 at a place visible from the whole space.

Each person carrying a GSM handset 3 entering the space puts by his own or by the intermediary of a servant, his handset 3 in a free location 2 of the docking station.

By doing this the output port 8 of the handset 3 is automatically connected to the connector 7 of an interface processor 5 while its battery terminals 17 are connected to the power supply terminals 16 at the location 2.

When his handset 3 is called, said interface processor 5 detects the incoming call and sends a signal to the display 4 which displays information about the call, for instance by displaying the handset ID number, whereafter the handset owner can take his handset 3 at the docking station for answering the call.

When two or more docking handsets 3 are receiving an incoming call, the display 4 will show information about the two simultaneous calls.

One or more supplementary displays 4, situated for instance on distant locations may be connected to the locations 2 of the base 1.

The invention is not limited to GSM handsets 3, but can be applied with all kind of mobile communication handsets, such as DECT handsets or beepers.

What is claimed is:

1. A docking station for at least one mobile or cordless telecommunication handset (3), particularly a telephone handset, said docking station comprising:

a base (1) operative to receive the telecommunication handset (3), wherein said base (1) is adapted to receive simultaneously a plurality of mobile telecommunication handsets (3) and comprises therefor a plurality of locations (2) for a handset (3);

a public display (4); and an interface processor (5) between each location (2) of the base (1) and the display (4), said interface processor (5) comprising:

means for detecting an incoming call for a handset (3) docked in the location (2); and means for controlling said public display (4) in order to notify of this detection, including displaying a name of the handset owner on said public display (4), including displaying a name of an owner of the handset receiving the incoming call on said public display (4), wherein all handsets (3) docked in said docking station are simultaneously monitored for incoming calls.

2. The docking station according to claim 1, wherein said means for controlling the display (4) are such that the display further notifies of an incoming call by displaying a number allotted to the location (2) of the called handset (3).

3. The docking station according to claim 1, wherein said means for detecting an incoming call includes:

a connector (7) at the location (2) permitting a connection with a corresponding output port (8) of the handset (3) docked in this location (2).

4. The docking station according to claim 1, wherein the interface processors (5) are connected to the display (4) by means of electronics (12) mounted in the base (1) and by wiring (13).

5. The docking station according to claim 1, further comprising a power supply (6) which recharges a handset battery (18) of the telecommunication handset (3) docked in one of the locations of said plurality of locations (2) of said base (1).

6. The docking station according to claim 1, wherein said means for controlling the display (4) are such that the display further notifies of an incoming call by displaying a handset identification number.

7. The docking station according to claim 1, wherein said means for controlling the display (4) are such that the display further notifies of an incoming call by displaying custom information.

8. The docking station according to claim 1, wherein said means for controlling the display (4) are such that the display further notifies of an incoming call by displaying an identification of the caller.

9. The docking station according to claim 1, wherein the interface processors (5) are connected to the display (4) by means of electronics (12) mounted in the base (1) and by a wireless transmitter-receiver.

10. The docking station according to claim 1, wherein said public display (4) is situated separately from said base (1).

\* \* \* \* \*